United States Patent [19] Schneiderhan et al.

[11] 3,870,865
[45] Mar. 11, 1975

[54] METHOD AND APPARATUS FOR OPTICAL READING OF RECORDED DATA

[75] Inventors: Edward M. Schneiderhan, Buffalo Grove; John E. Jones, Winnetka; Henry P. Briggs, Northbrook, all of Ill.

[73] Assignee: Cummins-Allison Corp., Glenview, Ill.

[22] Filed: July 5, 1973

[21] Appl. No.: 376,361

[52] U.S. Cl. .......................... 235/61.11 E, 250/566
[51] Int. Cl. .......................... G06k 7/10, G08c 9/06
[58] Field of Search .............. 235/61.11 E, 555, 566

[56] References Cited

UNITED STATES PATENTS

| | | | |
|---|---|---|---|
| 2,448,830 | 9/1948 | Robbins et al. | 235/61.11 E |
| 3,163,746 | 12/1964 | Hoeser | 235/61.11 E |
| 3,566,083 | 2/1971 | McMillin | 235/61.11 E |
| 3,593,030 | 7/1971 | Jaskowsky | 235/61.11 E |
| 3,676,690 | 7/1972 | McMillin et al | 235/61.11 E |
| 3,737,629 | 6/1973 | McMillin et al. | 235/61.11 E |

*Primary Examiner*—Daryl W. Cook
*Attorney, Agent, or Firm*—Wolfe, Hubbard, Leydig, Voit & Osann, Ltd.

[57] ABSTRACT

A data processing method and apparatus for reading data that is recorded on a document or other record medium in the form of a plurality of lines of indicia which may be either reflective marks (e.g., printed or handwritten) or perforations. A self scanning linear array of photoelectric sensors (e.g., photodiodes), having at least two sensors within each center-to-center spaced of adjacent indicia, scans the document as it is moved past the array. The linear array of photoelectric sensors is oriented transversely across the lines on indicia, and light is directed onto the indicia so that the sensors generate electrical signals representing the indicia as they are moved past the array. A single linear array may be used to sense both reflective marks and perforations by directing light onto both sides of the document. A system is provided for separating electrical signals representing reflective marks from signals representing perforations in the output from the single array of photodiodes.

5 Claims, 11 Drawing Figures

FIG. 1
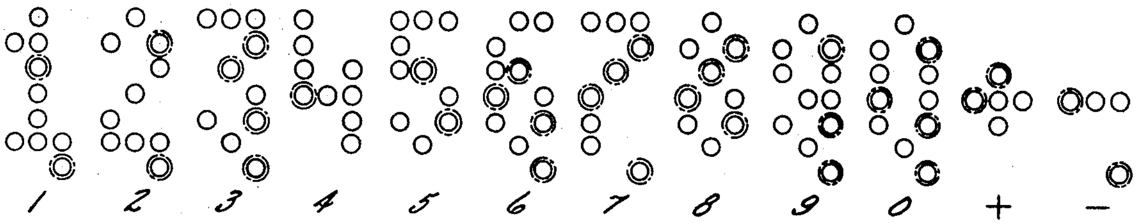
FIG. 2 FIG. 3
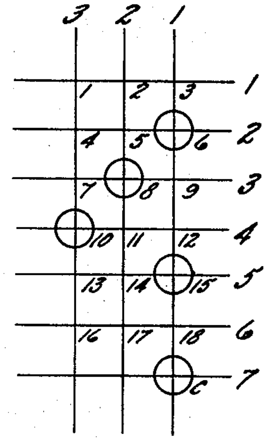
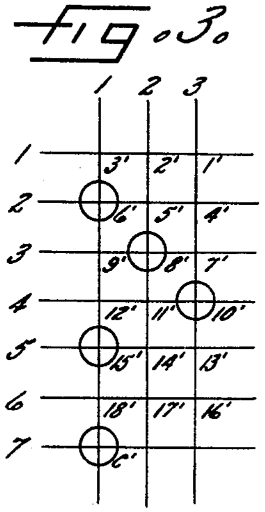
FIG. 4
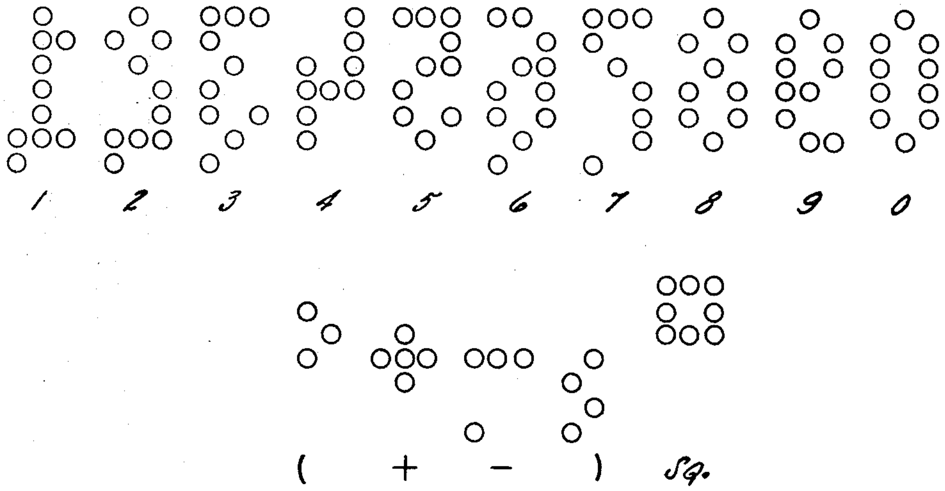

METHOD AND APPARATUS FOR OPTICAL READING OF RECORDED DATA

Machines have been available for some time for automatically reading documents by "optical scanning" of data recorded thereon. A variety of different types of scanning devices have been used in these machines, including photocells arranged in columns or matrices to detect various types of characters by various reading techniques such as:

1. "optical mark reading" (OMR) in which the presence or absence of a handwritten or printed character is detected by the amount of light reflected from each character position;
2. "optical character recognition" (OCR) in which the shape of a handwritten or printed character is determined by the amount of light reflected from different segments of the character; and
3. "optical data processing" (ODP) in which the presence or absence of a perforated character is detected by light passing through the perforations.

In the OMR and ODP techniques, each character may be represented by a plurality of marks or perforations arranged according to a binary code, in which case the individual marks or perforations representing each character are referred to as character "indicia."

In recent years there has been introduced an improved optical scanning device known as a "self scanning photodiode array," which is an integrated circuit including a large number of photodiodes and a shift register for deriving outputs from the photodiodes cyclically in a selected sequence. These self scanning photodiode arrays have been used in OCR systems, and they have also been used in a bar code reader, but each of these systems has a very limited area of application and, therefore, does not appeal to a broad range of users. Consequently, such systems have a relatively narrow market, and require costly redesign if they are to be adapted to an application for which they were not originally intended.

It has now been discovered that the self scanning photodiode array can be utilized in a single system which is capable of reading virtually any desired OMR format, any desired ODP format, or any combination thereof. For example, the system can read OMR data in which the characters are represented by "marked code" indicia, bar code indicia, conventional printed indicia arranged in a binary code, etc.; or it can read ODP data in which the characters are represented by perforations arranged in either a legible or illegible format, such as the "in line" binary code format. Furthermore, the system can read the OMR and/or the ODP data in any number of different formats, using any number of different indicia, on the same document and, if desired, at the same time. Moreover, this capability of reading the different types of data, represented by reflective and/or perforated indicia, may be achieved in a system which uses only a single photodiode array.

Optical reading systems have been proposed heretofore for reading either OMR or ODP data, but the versatility of such systems has been rather severly limited. Examples of such systems are described in the assignee's Quinn et al. U.S. Pat. No. 3,033,449 and Dilsner et al. U.S. Pat. No. 3,558,859. In the Quinn et al. system, each data field to be read requires a special prefix to be printed on the document to tell the machine what to read; only one type of data can be read at any given time; only characters represented by perforated indicia can be read; the data to be read must be restricted to a limited area of the document; and the character indicia must be accurately spaced at certain prescribed intervals along both the $x$ and $y$ axes. The Dilsner et al. system is capable of reading both reflective and perforated indicia, but it requires two different arrays of photocells to do so; it does not require special prefixes, but it requires sprocket holes in the document which are monitored by a sprocketing photocell to determine the exact position of the document at all times; only one type of reflective or perforated data can be read at any given time; the data to be read must be restricted to a limited area of the document; and the character indicia must be accurately spaced at certain prescribed intervals along both the $x$ and $y$ axes.

It is a primary object of the present invention to provide an improved optical reading system which is capable of reading a variety of different OMR, ODP or OCR data without requiring special prefixes on the document to indicate what type of data is to be read. A related object of one particular embodiment of the invention is to provide such a system which requires only a single array of photodiodes to read all the different types of data.

Another object of the invention is to provide an improved optical reading system of the foregoing type which is capable of reading a plurality of different types of OMR, ODP and OCR data on the same document and at the same time.

A further object of the invention is to provide such an improved optical reading system which is capable of reading data characters represented by reflective and/or perforated indicia, preferably with the use of only a single array of photodiodes.

Yet another object of the invention is to provide an improved optical reading system of the type described above which is capable of reading data located in any area of the document and at any desired indicia spacing. In this connection, one particular object of the invention is to provide such a system which is capable of reading data represented by one of more different types of indicia, or in two or more different codes, at the same time.

BRIEF DESCRIPTION OF THE DRAWINGS

FIGS. 1–8 represent a number of codes that can be read by the reading system of the present invention.

Figure 5:
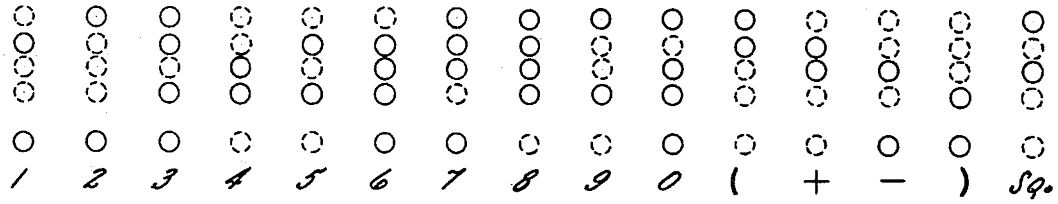

To facilitate an understanding of the present invention, a number of the OMR and ODP codes that can be read by the reading system to be described in more detail below will be initially explained with reference to FIGS. 1–8. It will be appreciated that the reading system is capable of reading codes other than those that will be specifically described herein, including codes that are not presently known and that might be developed in the future, but the exemplary codes to be described herein will suffice to illustrate the advantages and versatility of this invention.

1. The "Readable" ODP Code

The characters visibly represented by the patterns of perforations in FIG. 1 are located conventionally within a 3 × 6 station rectangular matrix. As indicated more clearly in FIG. 2, the field area for receiving perforations to represent any one of a plurality of characters is rectangular in shape and has 18 possible stations (numbered as shown) located at the intersections of three vertical and six horizontal imaginary lines. In addition to the 18 stations thus formed within a given rectangular field, a 19th station is located in the third vertical line (on the right). This latter station is employed for parity checking purposes, and is here identified by the character *c*. By applying perforations selectively at different ones of the 19 stations within a 3 × 6 station matrix, any of the numerical characters 0–9, +, or − can be visibly represented. FIG. 1 shows the particular stations which receive perforations in order to represent such numerical characters.

In a 3 × 6 station matrix of the type shown in FIG. 2, and with characters visibly represented by the patterns of perforations shown in FIG. 1, four significant locations exist at stations 6, 8, 10 and 15, which are represented by circles in FIGS. 1 and 2. For purposes of parity checking, the auxiliary station *c* is also made a significant location. That is, any of the numerical characters 0–9, ×, or − contains perforations in a unique combination of perforations in the five significant locations. By identifying the combination of perforations in significant locations, the character itself can be identified. The "code" for this purpose, which will be referred to hereinafter as the "readable" or R ODP code, is made clear by FIG. 1. It will be seen that the numeral "1" contains perforations at significant locations 8 and *c*, and that none of the other characters of FIG. 1 contains perforations at these, and only these, significant locations. Such significant locations are represented, for clarity, in FIG. 1 by surrounding circles, and it will be understood that such circles are not actually applied to the business documents. In like manner, the character "2" contains perforations at significant locations 6 and c, and none of the other characters contains perforations at this particular combination of significant locations. The remaining combinations of significant locations which receive perforations as the other characters are applied within a field area will be apparent from an inspection of FIG. 1. Since the significant locations for the R code are necessarily in different vertical columns or "lines" to form portions of readable characters, the R code is a "plural line" code.

2. The "Readable Reverse" (RR) ODP Code

The characters used in the RR code are illustrated by the examples in FIG. 4, from which it can be seen that the RR characters are simply the mirror images of the R characters described above. Consequently, the significant locations of the RR characters are the same as those described previously for the R characters, provided a reverse 3 × 6 rectangular station matrix, as illustrated in FIG. 3, is used. In both codes, the characters are conventionally spaced 0.3 inch center-to-center, and a space corresponding to one vertical line is provided between adjacent character fields, so the spece between adjacent indicia columns within a character field is 0.075 inch center-to-center. The space between adjacent indicia rows, i.e., the vertical indicia spacing, is also 0.075 inch center-to-center.

3. The "In-Line" (IL) Code

In the IL code, the characters are represented by illegible, in-line coded perforations. As shown by the exemplary characters in FIG. 5, each in-line perforation field consists of a single vertical row of perforation stations which preferably are located at levels 2, 3, 4, 5 and 7, of the readable code matrix. Each of these perforation stations is a significant location, i.e., the presence or absence of perforations in different combinations of m levels (here $m = 5$) of a single line can, according to a predetermined code, represent any one of a number of different characters. As shown in FIG. 5, the numerical character "1" is represented by perforations at levels 3 and 7 in a given line. The numerical characters "2" or "3" are represented by perforations at levels 2, 7 and 2, 3, 5, 7, respectively. The other combinations of perforation locations to represent different numerical characters will be evident from FIG. 5. Plus or minus symbols may also be represented by perforations in the locations shown. The spacing of the "in-line" indicia columns and rows, i.e., both the horizontal and vertical spacing, is 0.075 inch center-to-center.

It can be seen that the five levels of significant locations in the legibile R and RR code matrices correspond to the five levels of significant locations in the single-line code field. In other words, the significant locations for both the legible R and RR codes and the illegible IL code appear in the same five levels, namely levels 2, 3, 4, 5, and 7 of the matrices illustrated in FIGS. 2 and 3.

4. The "Marked" OMR Code

Figure 6:
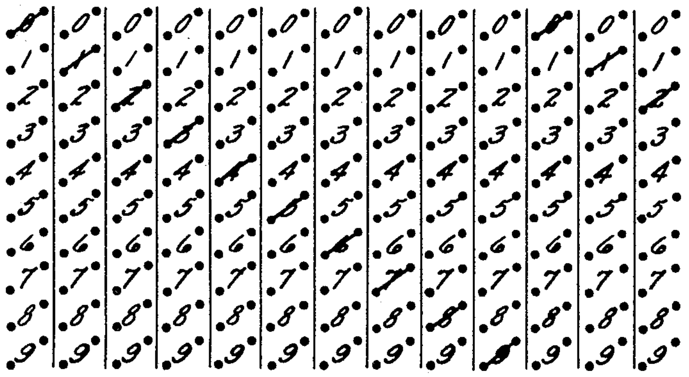

The "marked" code, which is illustrated in FIG. 6, utilizes a preprinted pattern of readable characters which are not visible to the automatic reading system, but selected characters in the preprinted pattern are overmarked with pen or pencil marks that are visible to the reading system. The vertical spacing of the preprinted digits is conventionally 0.166 inch center-to-center, while the center-to-center spacing of the columns is 0.3 inch. The vertical lines between adjacent columns of the preprinted digits indicate the horizontal center distance of the guide dots. When encoding, the pen or pencil mark is simply drawn diagonally through the selected character from one dot to the other, as illustrated in FIG. 6.

5. The "Bar" OMR Code

Figure 7:
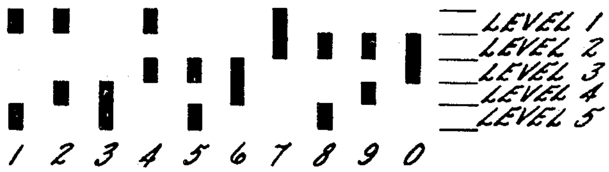

The "bar" code, which is illustrated in FIG. 7, is a five-level binary code formed by bars that are conventionally 0.08 inch high and 0.04 inch wide. The vertical spacing is 0.08 inch center-to-center, so that when two bars are marked on adjacent levels, they actually form one solid bar 0.16 inch high. The horizontal spacing is usually 0.075 inch center-to-center. Each digit is formed by using two levels according to the following table:

| | Digits | | | | | | | | | |
|---|---|---|---|---|---|---|---|---|---|---|
| | 1 | 2 | 3 | 4 | 5 | 6 | 7 | 8 | 9 | 0 |
| Value: | | | | | | | | | | |
| P | x | x | | x | | | x | | | |
| 7 | | | | | | | x | x | x | x |
| 4 | | | | x | x | x | | | | x |
| 2 | | x | x | | | x | | | | |
| 1 | x | | x | | x | | | x | | |

6. The "Computer Printed" (CPR) OMR Code

The computer printed code, (referred to hereinafter as the "CPR" code) which is described in more detail in the assignee's U.S. Pat. No. 3,541,960, is a five-level binary code which is printed at the same time that uncoded informational data is printed on the document, by means of a high-speed computer printed for example. The vertical spacing within each column is usually 0.166 inch center-to-center, the horizontal spacing of the columns is 0.1 inch center-to-center, and each character is 0.1 inch high. All values are formed by printing either two or four characters in a column, according to the following table:

| | Digits | | | | | | | | | |
|---|---|---|---|---|---|---|---|---|---|---|
| | 1 | 2 | 3 | 4 | 5 | 6 | 7 | 8 | 9 | 0 |
| Value: | | | | | | | | | | |
| 1 | 1 | | 1 | | 1 | | 1 | | 1 | |
| 2 | | 1 | | | | 1 | 1 | | | 1 |
| 4 | | | | 1 | 1 | 1 | 1 | | | |
| 8 | | | | | | | | 1 | 1 | 1 |
| P | 1 | 1 | | 1 | | | 1 | 1 | | |

7. The Hollerith ODP Code

Figure 8:
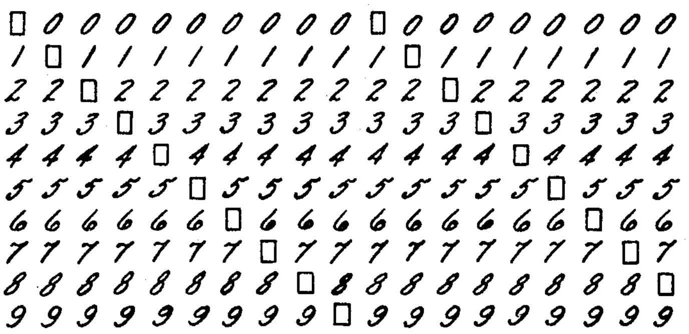

The Hollerith code, which is illustrated in FIG. 8, is a simple 10-level code in which each level represents one of the digits 0 through 9. The vertical spacing is 0.250 inch center-to-center, and the horizontal spacing is 0.250 inch center-to-center.

Figure 9:
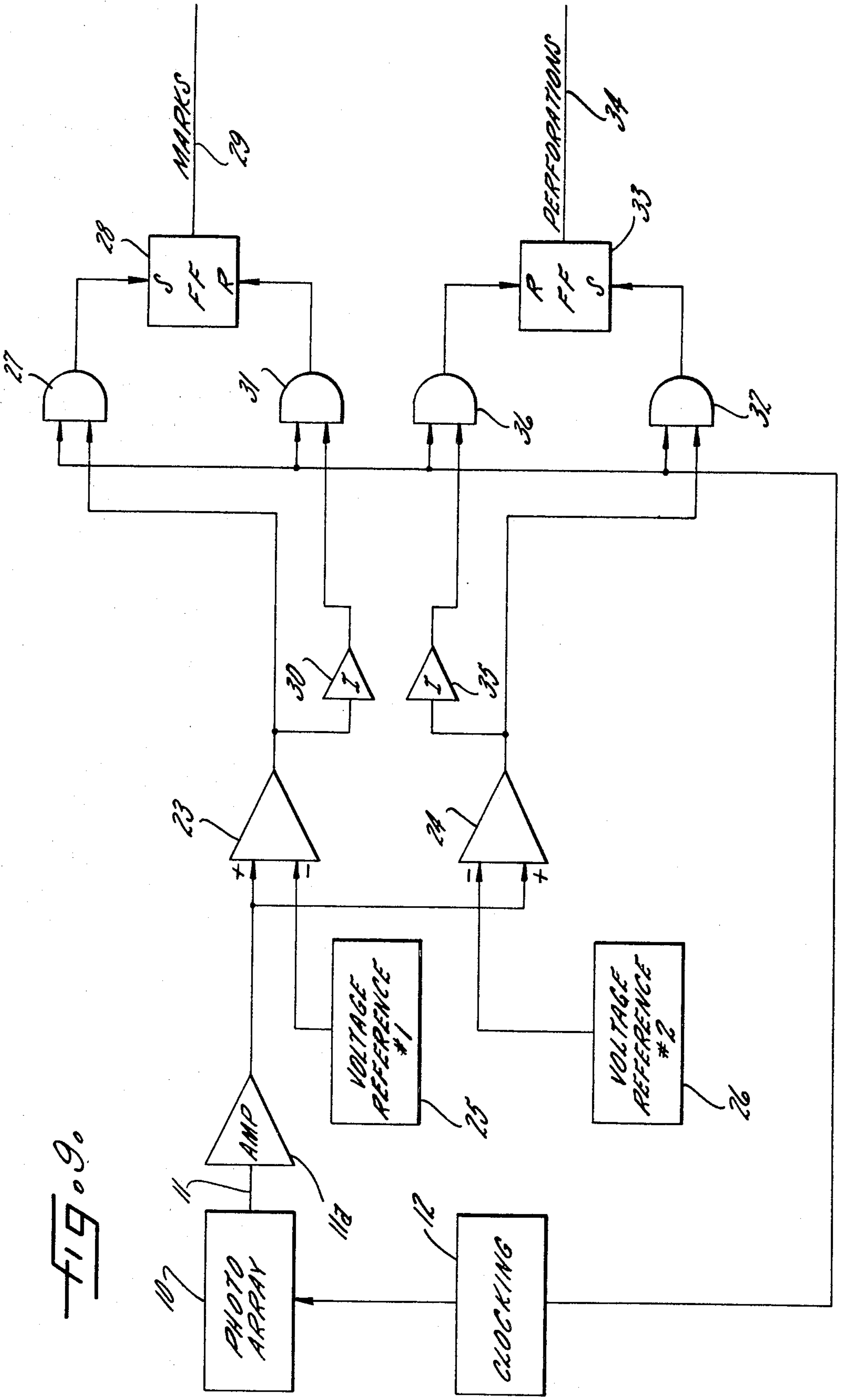
FIG. 9 is a diagram of an optical reading system embodying the invention.

In FIG. 9 there is illustrated in block diagram form an optical reading system embodying the invention. The present state of the art of optical reading systems is such that stacking and transport mechanisms for automatically handling the documents to be read, and transporting them at the desired speed past the reading head, are well known. As the documents are transported past the reading head, the data-bearing surface of each document is illuminated so that light is either reflected off the character indicia and the adjacent background area and/or passed through the perforated indicia, for detection by the photodiodes in the adjacent self scanning photodiode array 10. The array 10 is an integrated circuit comprising a row of closely spaced photodiodes which are continually connected in sequence to an output line 11 by means of an integrated circuit shift register receiving clock pulses from a generator 12. Self scanning photodiode arrays with built-in shift registers are commercially available, such as the "Reticon" Solid-State Line Scanner made by Reticon Corporation, 365 Middlefield Road, Mountain View, Calif., 94040. These arrays are available in a variety of different row sizes, from a 64-element row on 2-mil centers to a 512-element row on 2-mil centers.

Figure 11:
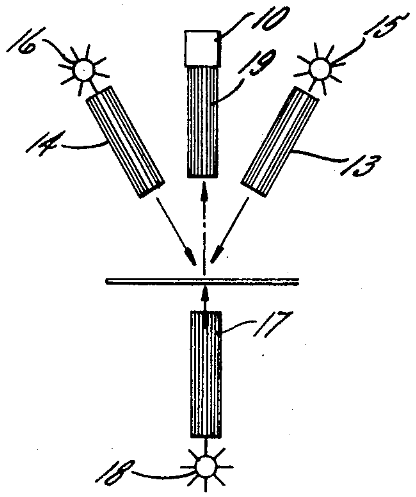
FIG. 11 shows the photodiode and light-source arrangement.

In accordance with another particular aspect of the invention, light is directed onto both sides of the record medium so that a single array of photodiodes located on only one side of the medium can sense both the reflective marks and the perforated indicia, and a system is provided for separating the signals representing the reflective marks from the signals representing the perforations in the array output. Thus, as illustrated in FIG. 11, light is preferably directed onto the surface of the document facing the array 10 by means of a pair of conventional bundles 13 and 14 of fibrous light pipes located on the leading and trailing sides, respectively, of the array 10 so that light is directed onto both sides of any character indicia located between the two bundles 13 and 14. The light conducted by the two bundles 13 and 14 is derived from two light sources 15 and 16, respectively. This symmetrical illumination of the indicia from opposite sides ensures relatively uniform and constant illumination of the indicia even where there are bends, creases or other small surface irregularities in that portion of the document where the indicia appear. On the opposite side of the document from the array 10 a third bundle 17 of fibrous light pipes conducts light from a source 18 onto the document so that light is transmitted through any perforations that pass the array. Light reflected from, or passed through, the character indicia is conducted to the photodiode array 10 by a fourth bundle 19 of fibrous light pipes.

As the indicia are transported past the photodiode array 10, electrical pulses representing the indicia are generated on the output line 11. The scan rate, i.e., the rate at which the clock pulses are generated to sequentially connect the photodiodes to the output line 11, is extremely fast, typically in the range of 1 KHz to 10 MHz. Consequently, the output pulses on the line 11 also appear at a high frequency, depending on the rate at which indicia pass the photodiode array. For example, if the scan rate is 10MHz in an array having 100 photodiodes and character indicia appear at an average rate of one per 10 photodiodes per cycle, the output pulses on the line 11 are generated at an average rate of 10 KHz. Of course, the output pulses are generated at a non-uniform rate with the time spacing of the pulses representing the physical spacing of the indicia in the transverse direction. That is, each scanning cycle sweeps across one transverse area of the document, and the point in time at which an output pulse appears in a given scanning cycle represents the position of the detected indicia in the transverse direction. Successive scanning cycles detect indicia in successive transverse areas of the document, so that the time space between successive cycles represents the longitudinal position of the detected indicia. It will be understood that the pulses merely indicate the presence of indicia at certain locations and do not represent any information concerning the shape of the indicia.

In keeping with the invention, the photodiode array preferably extends across a substantial area of the documents passing thereby, even the entire width of the documents if desired, and the photodiodes are spaced so that at least two photodiodes are located within each center-to-center space of adjacent indicia having the smallest center-to-center spacing of all the indicia to be read. For example, if the system has the capability of reading the marked code, bar code, CPR code, and IL code, the smallest center-to-center spacing in the transverse direction is that of the IL code, which is 0.075 inch. Consequently, the photodiodes should have a minimum effective center-to-center transverse spacing of 0.0375 inch. A suitable array for this purpose is the "Reticon" RL-64, which has 64 photodiodes so that it can scan a document width of 2.4 inches, with a suitable lens arrangement between the array and the document, while still providing two photodiodes for each center-to-center space for the indicia. Consequently, if any of the indicia are slightly out of position, due to skewing or misalignment of the document during the printing or reading operation for example, the indicia will still be detected. Moreover, the array detects any indicia that appear in the scanned area of the document, regardless of whether they are different types of indicia, regardless of whether they have different spacing, regardless of whether they pass the array at the same or different times, and regardless of whether they are in different codes or formats. With the reading system provided by this invention, it is immaterial whether these variables occur within a single document, or among a series of documents, and the frequency at which the variables occur is also immaterial.

Figure 10:
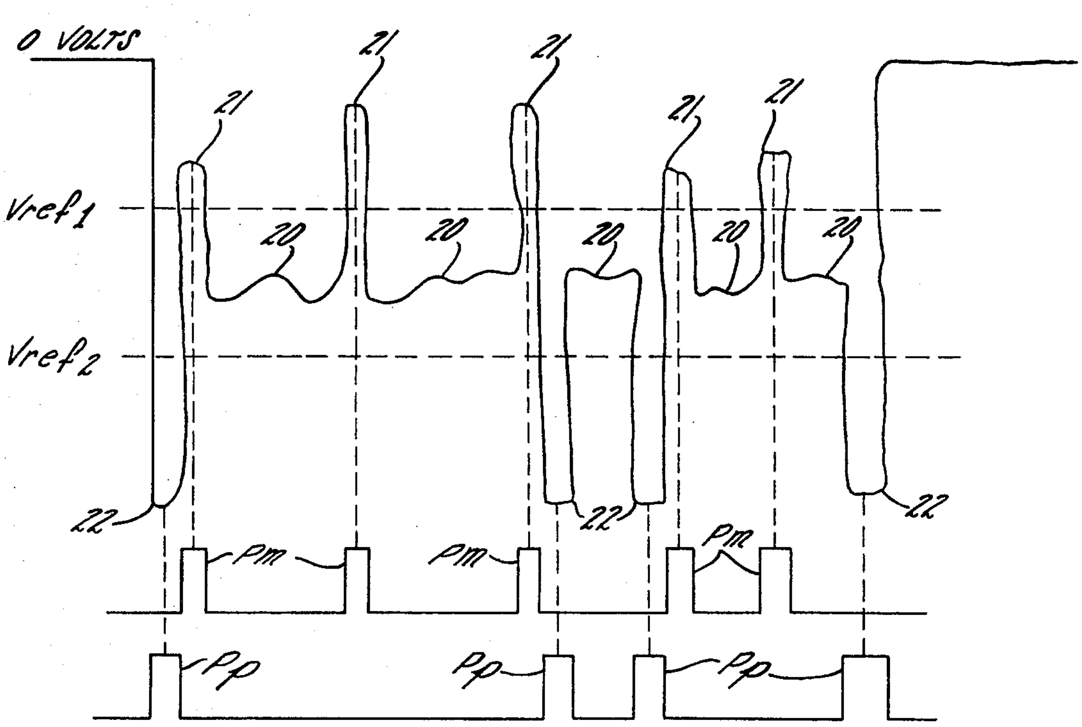
FIG. 10 represents voltage diagrams of the system.

In accordance with a further aspect of the invention, light is directed onto both sides of the record medium, a single photodiode array is used to detect both reflective and perforated indicia, and discriminating means are connected to the array output for separating the pulses that represent reflective indicia from the pulses that represent perforated indicia. Thus in the illustrative arrangement shown in FIG. 9, light sources are located on both sides of the document as it passes the photodiode array so that the photodiode array produces an output signal of the type illustrated in FIG. 10. It can be seen that this signal has three distinguishable levels: first, an intermediate level 20 which represents the background level of light sensed by the array when neither reflective nor perforated indicia are present; second, a "low" level 21 (i.e., low negative voltage, which is the highest part of the signal as illustrated in FIG. 10) which represents the level of light sensed by the array when reflective indicia are present; and third, a "high" level 22 (i.e., high negative voltage, which is the lowest part of the signal in FIG. 10) which represents the level of light sensed by the array when perforated indicia are present. Thus, it will be appreciated that it is only the low level portions 21 and the high level portions 22 of the array output that are of interest, since these are the only levels that represent sensed indicia.

To detect the high and low portions of the array output, the output signal illustrated in FIG. 10 is passed through an amplifier 11*a* and then applied to a pair of summing amplifiers 23 and 24. The other input to each of the summing amplifiers is a fixed reference voltage, amplifier 23 receiving a relatively low voltage VI (FIG. 10) from a source 25, and amplifier 24 receiving a relatively high voltage V2 (FIG. 10) from a source 26. When the array output signal is less than V1, the output of the amplifier 23 goes high, and this output is passed through an AND gate 27 which is enabled by the same clock pulses from the generator 12 that control the sequencing of the photodiodes in the array 10. The resulting high output of the gate 27 sets a flip flop 28, thereby producing a high output signal on line 29 that indicates the sensing of a reflective mark. To reset the flip flop 28, the output of the amplifier 23 is connected through an inverter 30 to an AND gate 31 so that when the amplifier output returns to its low level (when the array output exceeds VI), the next clock pulse causes the high output of the inverter 30 to be passed through the gate 31 and applied to the reset input of the flip flop 28. This returns the output of the flip flop 28 to its low level, thereby completing the generation of a positive-going output pulse Pm as illustrated in FIG. 10.

When the array 10 senses a perforated indicia, the array output becomes greater than V2 (FIG. 10) causing the output of amplifier 24 to go high. This output is passed through an AND gate 32 enabled by the clock pulses from generator 12, and the resulting high output of gate 32 sets a flip flop 33 to produce a high output on line 34 that indicates the sensing of a perforated indicia. To reset the flip flop 33, the output of the amplifier 14 is connected through an inverter 35 to an AND gate 36 so that when the amplifier output returns to its low level (when the array output is less than V2), the next clock pulse causes the high output of the inverter 35 to be passed through the gate 36 and applied to the reset input of the flip flop 33. This returns the output of the flip flop 33 to its low level, thereby completing the generation of a positive-going output pulse P*p* as illustrated in FIG. 10.

What is claimed is:

1. A data processing method comprising the steps of recording data on a record medium with the data being represented by a plurality of lines of indicia of different types and having a plurality of different center-to-center spacings, said indicia being selected from the group consisting of reflective optical marks on the record medium and perforations in the record medium, providing a self scanning photodiode array in the form of an integrated circuit with at least two photodiodes located within each center-to-center space of adjacent indicia having the smallest center-to-center spacing of all the indicia to be read so that all of the different types of indicia with different spacings are read by the single self scanning photodiode array, and moving the record medium relatively past said photodiode array with the array extending transversely across the lines of said indicia while directing light onto said indicia to generate electrical signals representing said indicia in response to movement of said indicia relatively past said self scanning photodiode array.

2. A data processing method as set forth in claim 1 which includes the steps of directing light onto both sides of said record medium so that a single photodiode array located on one side of the record medium generates electrical signals of a first magnitude representing reflective optical marks on the record medium and of a second magnitude representing perforations in the record medium, and separating the signals representing reflective optical marks from the signals representing perforations by discriminating between the signals of said first and second magnitudes.

3. Data processing apparatus for reading data represented on a record medium by a plurality of lines of indicia of different types and having a plurality of different center-to-center spacings, said indicia being selected from the group consisting of reflective optical marks on the record medium and perforations in the record medium, said apparatus comprising the combination of a self scanning photodiode array in the form of an integrated circuit with at least two photodiodes located within each center-to-center space of adjacent indicia having the smallest center-to-center spacing of all the indicia to be read so that all of the different types of indicia with different spacings are read by the single self scanning photodiode array, means for moving the record medium relatively past said photodiode array with the array extending transversely across the lines of said indicia, and means for directing light onto said indicia to generate electrical signals representing said indicia in response to movement of said indicia relatively past said self scanning photodiode array.

4. Data processing apparatus as set forth in claim 3 which includes means for directing light onto both sides of said record medium so that a single self scanning array of photodiodes located on one side of the record medium generates electrical signals of a first magnitude representing reflective optical marks on the record medium and of a second magnitude representing perforations in the record medium, and discriminating means responsive to the different magnitudes of said electrical signals for separating the signals representing reflective optical marks from the signals representing perforations.

5. In a processing apparatus as set forth in claim 4 which includes a single bundle of optical fibers for conducting light from the record medium to each of said photosensitive elements, a single bundle of optical fibers for conducting light from a light source on the opposite side of the record medium from said array to each potential perforation location on the record medium, and at least two bundles of optical fibers for conducting light from light sources on the same side of the record medium as said array to each potential reflective optical mark location on both the leading and trailing sides of said array.

* * * * *